3,400,150
PROCESS FOR PREPARING HYDROXYDIPHOSPHONIC ACIDS FROM ELEMENTAL PHOSPHOROUS, OXYGEN AND CARBOXYLIC ACIDS
David D. Whyte, Wyoming, and Phillip F. Pflaumer and Jimmie K. Dyer, Colerain Township, Hamilton County, Ohio, assignors to The Procter & Gamble Company, Cincinnati, Ohio, a corporation of Ohio
Continuation-in-part of application Ser. No. 475,887, July 29, 1965. This application May 31, 1966, Ser. No. 554,134
13 Claims. (Cl. 260—502.4)

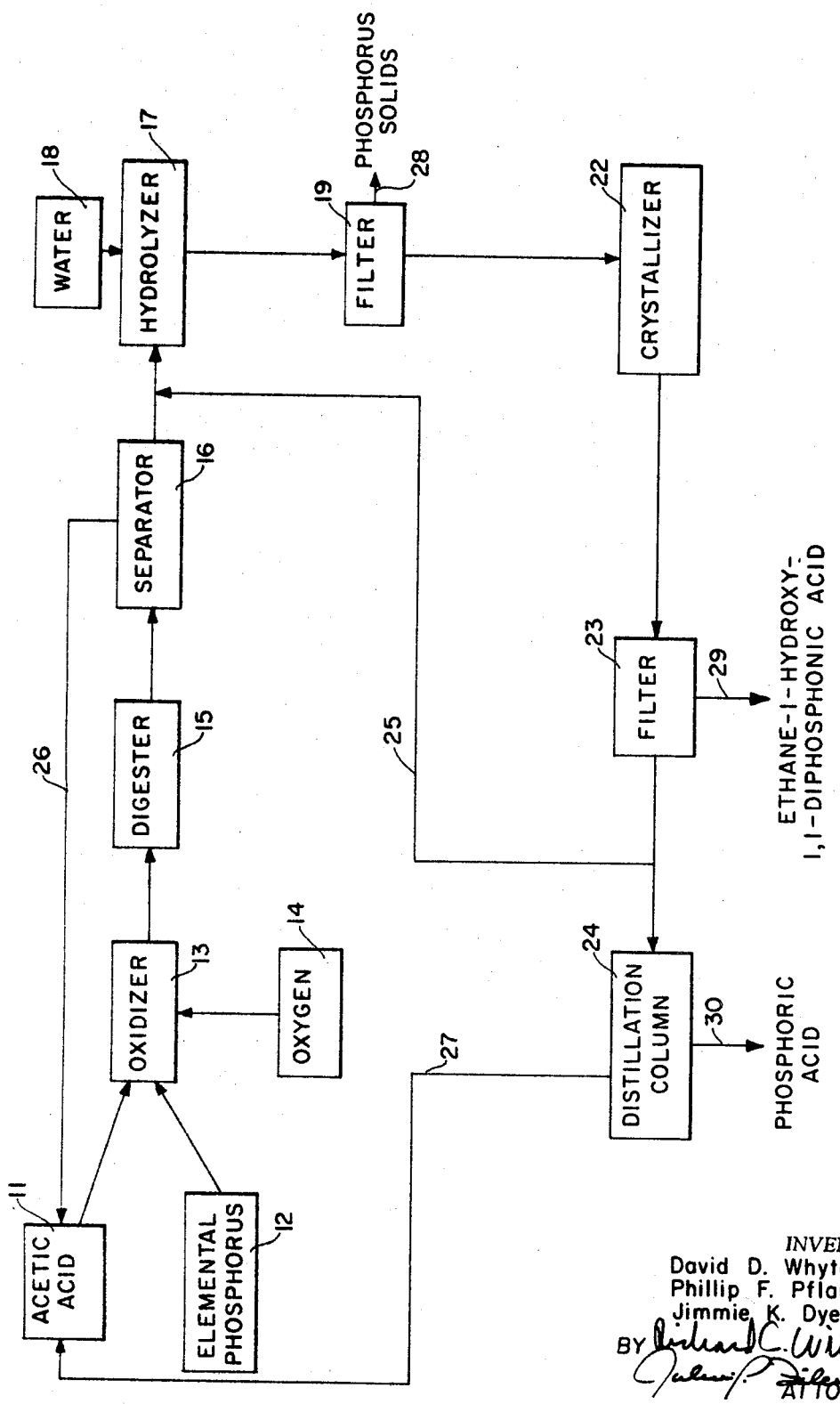

This patent application is a continuation-in-part application of Ser. No. 475,887, filed July 29, 1965, titled "Process for Preparing Ethane-1-Hydroxy-1,1-Diphosphonic Acid," and now abandoned.

This invention broadly relates to a process for preparing hydroxydiphosphonic acids from elemental phosphorus and carboxylic acids. More especially, it relates to a process for preparing hydroxydiphosphonic acids which comprises starting with elemental phosphorus, dispersing it in an organic medium containing a carboxylic acid, oxidizing the phosphorus in situ to an anhydride of trivalent phosphorus, reacting the anhydride of trivalent phosphorus with the carboxylic acid to form a reaction mixture and hydrolyzing the reaction mixture to the desired hydroxydiphosphonic acids.

There is described in a copending patent application Ser. No. 444,033, filed Mar. 30, 1965, by Oscar T. Quimby and James B. Prentice, and now abandoned, an important and basic reaction between an anhydride of phosphorous acid and acetic acid to form ethane-1-hydroxy-1,1-diphosphonic acid. The reaction described therein is an excellent process that results in high yields of the desired hydroxydiphosphonic acid in terms of the starting anhydride of phosphorous acid. As pointed out in the copending patent application, the basic reaction is between an anhydride of phosphorus acid and acetic acid. The source of the anhydride, e.g., $P_4O_6$, is immaterial and can be obtained and prepared in any manner.

However, while the yields and conversion rates to ethane-1-hydroxy-1,1-diphosphonic acid are high, i.e., in excess of 90–95%, this is in terms of the starting anhydride of phosphorous acid. When the yields and conversion rates are calculated in terms of the elemental phosphorus utilized in preparing the anhydride of phosphorous acid, the overall yields are less impressive. The point is that the known methods of converting elemental phosphorus to an anhydride of phosphorus acid are not too well developed. For example, the several examples in the Quimby et al. application describing the preparation of $P_4O_6$ indicate that, based on the starting elemental phosphorus ($P_4$), the percentage yields of the $P_4O_6$ ranged from about 20% to about 40%. The process employed by Quimby et al. to prepare $P_4O_6$ was the fairly well-known Wolf and Schmager method as described in Berichte 62 (1), 771–786 (1929). Thus, although the Quimby et al. process represents a substantial improvement in the art over previously known methods of preparing ethane-1-hydroxy-1,1-diphosphonic acid, the invention is handicapped by the difficulty in economically obtaining the starting anhydride of phosphorous acid.

It is an object of the present invention to provide a process for preparing hydroxydiphosphonic acids which are not handicapped by the lack of a satisfactory method for providing commercial quantities of $P_4O_6$. It is also an object to provide a process for preparing hydroxydiphosphonic acids at higher overall yields based on elemental phosphorus than heretofore obtained. It is also an object of the present invention to provide a continuous process for preparing hydroxydiphosphonic acids which is more economical and efficient based on utilization of elemental phosphorus. Yet another object is to provide a continuous and efficient process for preparing ethane-1-hydroxy-1,1-diphosphonic acid starting with elemental phosphorus. Still further objects of the present invention will become apparent from the following detailed description and the attached drawing.

In the respect that the present invention pertains to the preparation of ethane-1-hydroxy-1,1-diphosphonic acid, it represents a substantial improvement over the examples presented in the aforementioned copending Quimby et al. patent application. In somewhat broader terms according to which the present invention pertains to, the preparation of hydroxydiphosphonic acids, more generally, the present invention, represents an extension over the Quimby et al. disclosure. In other words, the present invention represents an improvement over the Quimby et al. disclosed EHDP process employing an anhydride of phosphorous acid and acetic acid. In addition, it also has as a novel feature the discovery that other carboxylic acids can be substituted for acetic acid to produce hydroxydiphosphonic acids other than EHDP.

The attached drawing is a flow chart of an embodiment of the present invention as described more fully hereinafter.

The term EHDP when used in the following description of the invention designates ethane-1-hydroxy-1,1-diphosphonic acid or a derivative thereof.

It has now been discovered that the foregoing objects can be obtained by a process for preparing hydroxydiphosphonic acids which comprises the steps of preparing a dispersion of elemental phosphorus in an organic medium containing a carboxylic acid, oxidizing the elemental phosphorus to an anyhydride of trivalent phosphorus in situ by introducing an oxidizing gas into said dispersion with vigorous mixing, reacting said anhydride of trivalent phosphorus and said carboxylic acid to form a reaction mixture containing phosphite intermediate compounds, heating said reaction mixture and converting said phosphite intermediate compounds to compounds containing carbon atoms bonded directly to phosphorus atoms, and hydrolyzing said compounds containing a carbon atom bonded directly to phosphorus atoms to form a hydroxydiphosphonic acid.

Elemental phosphorus does not react with carboxylic acids generally at room temperatures. It will be seen, therefore, that according to the present invention a reaction between elemental phosphorus and carboxylic acid is induced by converting the elemental phosphorus to a reactive oxidative state in situ in the presence of the carboxylic acid. For purposes of this invention, the reactive oxidative state of the phosphorus is as an anhydride of trivalent phosphorus. It has now been surprisingly discovered that this reactive state can be obtained in amounts ranging as high as about 70–80% by the procedure described herein. The chemistry of this reaction system is highly complex and the precise mechanism is not fully known or understood. Without limiting the invention in any way, what is believed to occur is that the anhydride of trivalent phosphorus, as it is formed in situ, unexpectedly combines with the carboxylic acid to form a complex intermediate. This unexpected complex formation holds and maintains the anhydride of trivalent phosphorus in a reactive state and effectively prevents it from disproportionating to a higher or lower oxidative state and also prevent it from undergoing further oxidation under the conditions of the reaction. As a result, approximately 70% to 80% of the starting elemental phosphorus is eventually converted to the desired hydroxydiphosphonic acid. There is nothing in the published literature on which this improvement could have been predicted. It represents a twofold or threefold improvement in the yields and conversion rates based on elemental phosphorus over the examples in the Quimby et al. copending patent application.

Elemental phosphorus is a non-metallic element that exists in several allotropic forms (white or yellow, red, and black). The white or yellow phosphorus (the terms are used interchangeably) are used in the present invention and the term elemental phosphorus, as used herein, designates these allotropic forms. Red and black phosphorus are insoluble in all solvents and cannot be used in the present invention.

White phosphorus (yellow phosphorus) exists as $P_4$, having a tetrahedral molecular structure. It is a brittle, waxy solid which has a melting point of 44.1° C. and a boiling point of 280° C. Its vapor density corresponds to a formula of $P_4$. It is virtually insoluble in water and alcohol, moderately soluble in chloroform and benzene, and very soluble in carbon disulfide.

The hydroxydiphosphonic acid prepared by the present invention depends upon the carboxylic acid reactant in which the elemental phosphorus is dispersed. By the reaction between the carboxylic acid and the anhydride of trivalent phosphorus, carboxyl groups are converted to hydroxydiphosphonic acid moieties. The invention applies broadly to carboxylc acids containing one or more carboxyl groups. In the case of aliphatic monocarboxylic acids, such as the fatty acid homologous series beginning with acetic acid, the reaction product is a corresponding hydroxydiphosphonic acid. In the case of aliphatic polycarboxylic acids the reaction product can be a mixture of mono- or dihydroxydiphosphonic acids depending on the specific reaction conditions as disclosed below. In other words, the reaction mixture can contain compounds in which one or both of the carboxyl groups is converted to a hydroxydiphosphonic acid moiety. Similarly with higher polycarboxylic acids, i.e., tricarboxylic acids, and the like, the reaction product will be comprised of a mixture of mono-, di-, and tri-, etc., hydroxydiphosphonic acids. As used in the present description of the invention, the term "hydroxydiphosphonic acid" is used generically to cover reaction products of the present process which contain at least one hydroxydiphosphonic acid moiety. It is the presence of at least one such hydroxydiphosphonic acid moiety in the reaction products which imparts to them sequestering and chelating properties which thereby make them useful in the manifold, widely known applications of sequestering and chelating compounds.

With this understanding of the role of the carboxylic acid reactant in the present invention, the full scope of the invention can be appreciated from the following disclosure of carboxylic acids which can be employed. The list is not intended as being all inclusive but only illustrative. Mixtures of these acids also can be used, if desired.

The carboxylic acid can be an aliphatic monocarboxylic acid or an aliphatic polycarboxylic acid containing from 2 to about 30 carbon atoms, preferably about 24 carbon atoms, and is saturated or unsaturated, straight chain or branched chain.

Examples of saturated aliphatic monocarboxylic acids are acetic acid, propionic acid, n-butyric acid, n-valeric acid, isovaleric acid, α-methylbutyric acid, pivalic acid, n-caproic acid, enanthic acid, caprylic acid, pelargonic acid, capric acid, undecylic acid, lauric acid, myristic acid, palmitic acid, stearic acid, arachidic acid, behenic acid, lignoceric acid, cerotic acid, melissic acid, and the like. Aryl substituted saturated aliphatic monocarboxylic acids such as phenylacetic acid likewise can be used.

Examples of unsaturated aliphatic monocarboxylic acids are acrylic acid, crotonic acid, isocrotonic acid, vinylacetic acid, methacrylic acid, oleic acid, linoleic acid, and the like.

Other examples of aliphatic monocarboxylic acids are the polyfunctional hydroxycarboxylic acids which contain one or more hydroxyl groups in place of one or more hydrogen atoms attached to carbon atoms of the chain. Specific examples are glycolic acid, lactic acid, alpha-hydroxy butyric acid, beta-hydroxy butyric acid, beta-hydroxy propionic acid, and the like.

Although the invention has been described as applying broadly to carboxylic acids, it is understood, of course, that each carboxylic acid will not behave in identically the same manner. It is known to those skilled in the art that the reaction properties of acids can and do differ. For instance, the first member of the above-mentioned series of acids may require special considerations.

It has been noted that formic acid, HCOOH, oxalic acid, $(COOH)_2$, and trifluroacetic acid, $CFl_3COOH$, are less reactive than, for example, acetic acid. Acetic acid, because it yields EHDP and for reasons discussed and illustrated below, is the single preferred carboxylic acid for the present invention.

Otherwise, the preferred carboxylic acids are the aliphatic monocarboxylic and dicarboxylic acids having from 2 to about 24 carbon atoms, but the upper limit can go as high as about 30 carbon atoms.

The proportions of the elemental phosphorus and the carboxylic acid can range over broad limits. For example, the proportions can range from less than stoichiometric amounts to stoichiometric amounts, i.e., two carboxylic acid groups per mole of phosphorus. Quantities of carboxylic acid in excess of stoichiometric amounts can be used going as high as 20–25 carboxylic acid groups per mole of phosphorus. Quantities higher than this tend to undesirably slow down the rate of the reaction. The preferred proportion of acid to phosphorous is that which provides from about 2 carboxylic acid groups to about 25 carboxylic acid groups per mole of phosphorus.

In the preferred embodiment of the present invention according to which ethane-1-hydroxy-1,1-diphosphonic acid is the desired product the molar ratio of the acetic acid to phosphorus should be in a range of from about .75:1 to about 50:1, and preferably from about 2:1 to about 20:1.

In as much as the present invention is closely related to the aforementioned copending Quimby et al. patent application and the process for the preparation of EHDP described therein and since the preferred embodiment of the present invention also is the preparation of EHDP, the following description of the present invention will also be in terms of the preferred EHDP embodiment. It will be understood, however, that the discussion of the steps of the present invention apply generally also to the carboxylic acids noted below. Where differences can be expected to occur when a carboxylic acid other than acetic acid is employed, these points are discussed separately.

Also for purposes of simplifying the present description and preserving clarity thereof, the anhydride of trivalent phosphorus is referred to most usually as $P_4O_6$. Thus, for purposes of this discussion, the present invention will be quite readily understood and appreciated by thinking in terms of preparing a dispersion of elemental phosphorus in the presence of an organic medium containing acetic acid, oxidizing the elemental phosphorus to an anhydride of trivalent phosphorus in situ, reacting the anhydride of phosphorus acid with acetic acid to form a reaction mixture containing phosphite intermediate compounds, heating said reaction mixture and converting said phosphite intermediate compounds to compounds containing carbon atoms bonded directly to phosphorus atoms, and thereafter hydrolyzing said compounds containing carbon atoms bonded directly to phosphorus atoms to form phosphonic acids.

In preparing the dispersion of the elemental phosphorus in the organic medium containing acetic acid, the phosphorus should be dispersed in finely divided state. In order to do this, it may be desirable to warm the acetic acid-phosphorus mixture to about the melting point of the phosphorus, i.e., 44.1° C., while vigorously mixing the mixture. The mean diameter of the phosphorus particles should be less than about 2 centimeters, and preferably less than 2 millimeters. The minimum size for the particles is relatively unimportant and could be as small as a single molecule of phosphorus.

The term dispersion is used herein in its broadest technical meaning. Thus, for example, it covers any suspension of finely divided, solid, liquid, or gaseous particles in a liquid medium. The term as used herein also covers liquid and solid dispersions of colloidal size and larger. It also covers molecular dispersions as this term is sometimes applied to true homogeneous solutions. In this latter context, the contemplation is a solution in which the waxy elemental phosphorus is dissolved in an organic solvent as defined and exemplified hereinafter.

It has already been noted that the acetic acid and phosphorus can be used in molar proportions of acetic acid to phosphorus of from about .75:1 to about 50:1 and preferably from about 2:1 to about 20:1.

After the phosphorus is finely dispersed in the organic medium containing the acetic acid, an oxidizing gas is introduced into the dispersion with vigorous mixing. This can be accomplshed in many different ways since the primary objective is to thoroughly distribute the oxidizing gas throughout the phosphorus dispersion. For example, the oxidizing gas can be introduced or passed directly into the phosphorus-acetic acid dispersion through appropriately disposed nozzles while the dispersion is being vigorously stirred. Another method of distributing the oxidizing gas into the dispersion is to provide a supply air space above the dispersion in a sealed reactor and then vigorously stir the dispersion with a hollow stirrer thereby causing the oxidizing gas to be drawn down through the stirrer and then throughout the dispersion.

The oxidizing gas introduced into the dispersion can be any oxygen-containing gas. It is possible to use air, ozone, or oxygen.

The pressure and flow rate of the oxidizing gas can be adjusted to contribute to agitation of the dispersed phase. The partial pressure of the oxygen can vary over wide limits, e.g., between .01 p.s.i. and 2000 p.s.i., preferably between 1 p.s.i. and 1000 p.s.i. The flow rate of the oxidizing gas passing into the dispersion is dependent, in part, on the desired rate of reaction but can range from 0.04 mole/hour/mole of phosphorus to about 300 moles/hours/mole of phosphorus. Preferably, the rate of addition should be from .3 mole/hour/mole of phosphorus to 100 moles/hour/mole of phosphorus.

The oxidizing gas should be introduced into the phosphorus-acetic acid dispersion while the dispersion has a temperature in the range of from about 20° C. to about 140° C., and preferably from 50° C. to 100° C.

As mentioned above, the amount of the oxidizing gas (stream of air, ozone, oxygen and the like) added to the system is dependent on several process conditions. It has been found, however, that the amount of oxygen which should be added in order to obtain a maximum amount of the anhydride of trivalent phosphorus, $P_4O_6$, should be sufficient to allow for an absorption by the phosphorus of from about 1.25 moles of oxygen to about 4.5 moles of oxygen per mole of phosphorus ($P_4$), and preferably from 1.5 to about 3.7 moles of oxygen per mole of phosphorus ($P_4$).

The dispersion should be vigorously stirred both during the addition of phosphorus to the acetic acid, in order to achieve a fine particle dispersion and the vigorous agitation should continue also during the introduction of the oxidizing gas to the dispersion to provide for good contact between the dispersed phosphorus and the oxidizing gas.

The reaction between the oxide of phosphorus and the carboxylic acid, e.g., acetic acid, commences as the mixture is heated and stirred during the addition of the oxidizing gas. Periods of reaction of from about 1 minute to about 6 hours are usually sufficient; preferably, the reaction period can be between 2 minutes and 4 hours. The oxidizing gas can be passed into the dispersion continuously during these periods at a metered rate. Alternatively, the gas can be added stepwise or incrementally, that is, by sequential addition of gas to the dispersion, as needed, to allow the reaction to continue at a desired rate.

The rate at which the oxidizing gas is added and the temperature at which this is performed will determine the composition of reaction product at the termination of the oxidation step. In the event that the oxygent addition is carried out at higher temperatures, e.g., 90° C.–140° C., and over a longer period of time, e.g., 2–3 hours, the reaction product will contain predominantly the hydroxydiphosphonic acid product and small amounts of phosphite intermediate compounds. Thus, in the instance of an acetic acid–$P_4O_6$ reaction under these conditions the major portion of the reaction product will be ethane-1-hydroxy-1,1-diphosphonic acid or condensates thereof which can readily be converted to the free acid.

A more rapid oxidation step, e.g., over a period of 2 to about 90 minutes and at lower temperatures, e.g., 30° C.–90° C., results in reaction mixture which contains large amounts of phosphite intermediate compounds together with small amounts of EHDP and EHDP condensates. In order to provide for the necessary rearrangement of the phosphite intermediates to the desired carbon-to-phosphorus bonded compounds, a rapid oxidation reaction step should be followed with a heating step referred to herein as a digestion step. Regardless of whether the oxidation step is performed over a short period or a longer period, it is desirable to employ a digestion step of sufficient length to convert the maximum amount of phosphite intermediate compounds to compounds containing carbon atoms bonded directly to phosphorus atoms, so-called C—P bonded materials.

The apparatus for this oxidizing step of the reaction can be a stirred tank, a series of stirred tanks, or an agitated column with the oxygen-containing gas flowing countercurrent to the carboxylic acid-phosphorus dispersion. Suitable units can be designed to effect the required conditions of oxygen addition.

The reaction between the anhydride of trivalent phosphorus and acetic acid is an exothermic one. Although a homogeneous solution is formed between these two reactants during the initial phases of the reaction, the reaction mixture tends to become cloudy and darkened if only stoichiometric amounts are used. This is followed by accelerating heat evolution. It is desirable to run the reaction in the presence of a diluent in order to absorb some of the heat of reaction. The cloudiness and darkening of the reaction mixture which tends to occur when the reactants are mixed at or near stoichiometric amounts is due to the formation of insoluble interemdiate reaction products which tend to precipitate out. In case of the more viscous intermediates, they can interfere considerably in the necessary molecular rearrangement of the phosphite intermediates (i.e., P—H bonds) to the essential phosphorous-carbon bonded materials. The formation of the viscous precipitates interferes also with the exchange of reactants between phases.

For these reasons, it is desirable to mix the elemental phosphorus and acetic acid in the presence of a diluent which can dissolve the reactants and which is also capable of at least partially dissolving the insoluble intermediate reaction products which are formed and which tend to precipitate out of solution. Excess acetic acid within the proportions given above admirably satisfies this purpose of the diluent. While excess acetic acid is preferred, other materials can also be used as the diluent.

Sulfones are a satisfactory type of diluent and solvent material. Di-n-propyl sulfone, $(C_3H_7)_2SO_2$, and sulfolane, $CH_2CH_2CH_2CH_2SO_2$, can be used either alone or in mixtures. The mixtures can consist of any proportions of the two materials, but preferred ratios range from about 9 parts of di-n-propyl sulfone to 1 part of sulfolane to about 1 part of di-n-propyl sulfone to 9 parts of sulfolane. For some reactions, mixtures are actually preferred.

Other satisfactory solvents include tetrachloroethane, $Cl_2CHCHCl_2$, and dibutyl ether, $(C_4H_9)_2O$, and diglyme, $CH_3OCH_2CH_2OCH_2CH_2OCH_3$. The halogenated hydrocarbon appeared to dissolve the intermediates as well as or better than the aforementioned sulfones. It was noted, however, that it semed to react with the $P_4O_6$ and/or one of the intermediates of the reaction mixture; and for this reason, it is somewhat less desirable than the sulfones, although satisfactory in all other respects. The lower aliphatic ether compound, dibutyl ether, on the other hand, was chemically inert to the initial reagents but was not polar enough to dissolve the reaction intermediates as much as the sulfones or tetrachloroethane solvents. Just as mixtures of the di-n-propyl sulfone and sulfolane provide the advantages of each compound, similarly one can use mixtures of tetrachloroethane, dibutyl ether, and diglyme in all proportions. Mixtures can also be used of these compounds with acetic acid.

It can readily be appreciated, in light of the preceding discussion about the functions of the diluent, that the quantity used is relatively unimportant.

In the embodiment of the present invention according to which acetic acid is used in sufficient excess to serve not only as the reactant but also as a solvent for the reaction, the amount of acetic acid can range up to as high as 100 moles of acetic acid per mole of the anhydride of phosphorous acid. Even higher amounts can be used but the desired reaction and rearrangement of reaction intermediates as described herein is considerably slowed down. consequently, it has been found desirable to operate with molar proportions of the acetic acid to the anhydride of phosphorous acid of from about .75:1 to about 50:1 and more preferably, from about 2:1 to about 20:1.

As regards the other suitable diluents as illustrated and described above, they should be employed at a level of from about .5 to about 5 times the combined weight of the reactants. The minimum amount which should be used is that amount which is necessary to efficiently control the reaction. In other words, there should be enough diluent present to sufficiently absorb the generated heat of reaction and satisfy the solubility requirements as detailed above. While certain embodiments of the present invention have been described in terms of the diluent consisting of excess acetic acid or one of the specific illustrative materials, the diluent can also contain mixtures of excess acetic acid and at least one or more of the other suitable diluents. Examples hereinafter demonstrate this feature.

There has now been described the embodiment of the invention according to which elemental phosphorus and acetic acid are caused to react in the presence of an organic medium. The term organic medium will now be seen to mean at least the diluent for the reaction which can be excess acetic acid, or any of the inert organic compounds mentioned above or mixtures of any of these materials.

Reference has been made to a heating step or a digestion step which may be optionally employed as a separate step according to this invention. It has been pointed out that the reaction between the anhydride of trivalent phosphorus and acetic acid results in the formation of phosphite intermediates. These phosphite intermediates upon heating are converted fairly readily to the desired carbon-to-phosphorous compounds. If the oxidation of the elemental phosphorus is carried out over a long enough time period, the phosphite intermediates which are formed during the early stages of the reaction will have had sufficient time to be converted to the carbon phosphorus materials. The need for additional heating required to convert the unconverted phosphite intermediates will not be very large due to the relatively small quantity of phosphite materials. On the other hand, if the oxidation reaction is conducted more rapidly and terminated during a shorter period, not enough time may have elapsed to allow for the phosphite to carbon-phosphorus materials. In this case, a separate digestion step can be used.

In either event, the digestion step essentially comprises maintaining the reaction mixture from the oxidation reaction at a temperature of from about 70° C. to about 170° C., preferably from 90° C. to about 150° C., for a period of from about 1 minute to about 4 hours, and preferably from about 5 minutes to about 1½ hours. If the temperature of the oxidation reaction falls within the temperature ranges just given, it will be necessary to maintain the temperature during the digestion step for the required amount of time. On the other hand, if the temperature during the oxidation step is between 20° C. and about 70° C., it will be necessary to apply a certain amount of heat to attain the desired temperature to achieve the desired molecular rearrangement during the digestion step.

Following the reaction between the anhydride of trivalent phosphorus, $P_4O_6$, and acetic acid, the reaction mixture can contain, in addition to the phosphite intermediates, a number of intermediates having carbon-phosphorus bonds including phosphonate condensates which can also involve three kinds of additional chemical bonding (C—O—C, C—O—P, and P—O—P). Digestion, however, converts the phosphite intermediates to intermediates having carbon-phosphorus bonds. Intermediates of the type formed by the reaction between $P_4O_6$ and acetic acid are described in the aforementioned Quimby et al. copending patent application.

The condensed phosphonate intermediates which are present in the reaction mixture after the digestion step are hydrolyzed by the addition of water to the reaction mixture to form a hydrolyzed solution containing free hydroxydiphosphonic acid and carboxylic acid, e.g., free ethane-1-hydroxy-1,1-diphosphonic acid and acetic acid. All condensed phosphonate intermediates, are hydrolyzed substantially completely to ethane-1-hydroxy-1,1-diphosphonic acid and acetic acid.

The amount of water employed in the hydrolysis step should, preferably, equal or exceed the stoichiometric amount necessary to form the EHDP.

The hydrolysis step can be carried out at room temperatures but usually higher temperatures are used. A satisfactory rate of hydrolysis is attained in the range of 90° C. to about 170° C., but it is preferred to operate in a range of about 100° C. to 150° C. Typically, the hydrolysis can be carried out in a period ranging from a few seconds to four hours and preferably from about three minutes to about two hours.

The hydrolysis can be only partially completed by adding less than the stoichiometric amount of water, or it can be completed by flooding the system with an excess of water. The process is flexible at this stage of the reaction. If only partial hydrolysis is desired at this point in the reaction, the balance of the water addition can be made a part of the purification steps described below.

Following the hydrolysis step, the reaction product contains the desired EHDP acid. There may also be present within the reaction mixture, such materials as unreacted acetic acid or excess organic diluent, as well as by-product phosphoric and phosphorous acids.

Separation and recovery of EHDP acid can be by any convenient manner. For example, if the hydrolysis is carried out so that the hydrolyzed material contains only a small amount of water, e.g., 1% or less, the mixture can be cooled to a temperature, in the range of from about 10° C. to about 50° C., typically about 30° C., while being gently stirred. EHDP begins to crystallize as the hydrolyzed mixture cools. At about 30° C., the crystal formation requires from about 1 to about 2 hours. The mixture can be seeded with EHDP crystals to accelerate the crystallization process. Because of the considerably higher solubility of by-product phosphoric acid in acetic acid, it will remain in solution. After the EHDP has crystallized sufficiently, it can be easily filtered from the solution in a conventional manner, e.g., a rotary filter.

The free acid thus recovered can be neutralized to any desired salt form by reacting it with an appropriate base such as, for example, sodium or potassium hydroxide.

A more detailed description of the process and apparatus will be given with reference to the accompanying drawing showing diagrammatically a flow chart for the steps of directly converting elemental phosphorus to a hydroxydiphosphonic acid via the reaction sequence described above. The drawing is presented in terms of preparing ethane-1-hydroxy-1,1-diphosphonic acid starting with acetic acid 11 and elemental phosphorus 12. The phosphorus is added to an oxidizer tank 13 containing excess acetic acid and a fine dispersion is prepared by vigorously stirring the materials and warming slightly to melt the phosphorus. Oxygen 14 is then introduced into the oxidizer tank 13 in finely distributed bubbles with continued stirring. The principal objective in the oxidation step is that both the oxygen and the phosphorus should be dispersed in a finely divided state in the acetic acid. In a typical operation, the oxidizer is run at about a 15/1 to 20/1 mole ratio of acetic acid to phosphorus, a 3.6/1 mole ratio of oxygen/phosphorus and a temperature of about 80° C. The acetic acid is preferably used in excess of stoichiometry because it serves not only as a reactant with the anhydride of trivalent phosphorus but also as a solvent for the reaction. Oxidation time is typically on the order of about a 5–15 minute range. About 98% of the phosphorus is oxidized in situ with about a 75/25 distribution between trivalent and pentavalent phosphorus formed during the oxidation. The trivalent phosphorus compound leads to the desired hydroxydiphosphonate moiety while the pentavalent phosphorus forms phosphate compounds. Due to the nature of the reaction, there is also formed a small amount of red phosphorus which as described earlier is one of the insoluble allotropic forms of phosphorus. It is a polymerized, three-dimensional molecular structure which does not enter into the reaction of the present invention. If a fine dispersion of phosphorus has been formed, the amount of red phosphorus formed rarely exceeds 4% and quite readily the amount can be held below 2%. In any event, the red phosphorus is removed from the reaction system by a conventional filtering step as described below.

Following the oxidation reaction and the reaction between the $P_4O_6$ and acetic acid in situ, the reaction mixture consists of two phases, a liquid phase and a solid phase. The liquid phase typically contains acetic acid, the phosphite intermediate compounds including acetylated phosphoric acid, acetylated phosphorous acid, and acid anhydride intermediates. It can also contain other components besides these, but for the most part it can be expected to contain at least these components. A solid phase is also present which is comprised predominantly of unoxidized red phosphorus and which rarely exceeds 4% by weight of the phosphorus. This unoxidized red phosphorus is, for all practical purposes, lost to the desired reaction of forming a hydroxydiphosphonic acid. Consequently, it can be removed at any time in the process without upsetting the desired reaction. In the drawing, a filtering step 19 is shown for this purpose following the hydrolysis step, but it could be practiced at other points in the process equally as well.

Following the oxidation step, the reaction mixture is optionally subjected to the digestion step as described earlier. For this purpose it can be passed from the oxidizer 13 to a digester 15; or the digestion step can occur in the oxidizer. This latter procedure has, as an advantage, a requirement for less equipment. In a continuous process, however, a separate digester can be used as shown in the drawing. In a typical continuous process, the digester takes the form of a plug flow reactor maintained at about 150° C. for about 15 minutes' duration. This is the step during which the phosphite intermediates rearrange to form carbon-phosphorus bonded EHDP precursors and condensates.

Following the digestion step, the mixture is a liquid system containing at least two phases. An upper liquid phase contains primarily acetic acid, acetic anhydride, phosphoric acid, phosphorous acid, EHDP condensates and acetylated forms of EHDP condensates. The lower layer is considerably more viscous and gummy than the top layer, and it typically contains primarily a major portion of EHDP and its condensates along with acetic acid.

As an optional step, it can be desirable to separate these phases at this point 16 and recycle the upper acetic acid liquid phase via line 26 to the acetic acid supply source 11. It can also be recycled to the oxidizer alternatively. The phase separation can be carried out by feeding the materials from the digestion step 15 into an ordinary gravity settling tank 16, from which the upper acetic acid phase is bled off from the top and the EHDP phase from the bottom. The separation of the acetic acid phase and the EHDP phase can also be achieved by centrifuging the mixture.

The EHDP-containing phase is then passed to a hydrolyzer 17, where in a typical situation a slight excess of water 18 is added with the temperature of the mixture at about 150° C. Under these conditions, the hydrolysis time will be about 15 minutes (it can be less) for a plug flow system.

The hydrolysis step can take place in any type of reactor unit 17. As an illustration, a series of stirred tank reactors can be used to provide the necessary hold time. For very short hold times, an in line mixer and a heat exchanger arrangement can be used.

The effluent from the hydrolyzer is typically a single liquid acid phase containing, for example, ethane-1-hydroxy-1,1-diphosphonic acid, acetic acid, phosphoric acid, phosphorous acid, water and any small amounts of red phosphorus from the oxidation step. The effluent can be filtered by ordinary means, e.g., by using a plate and frame filter press, to remove red phosphorus present. It is important that if the ultimate use of the ethane-1-hydroxy-1,1-diphosphonic acid is to be in detergent compositions, that the red phosphorus material be removed. An ordinary filtering step can be included in the process at any convenient stage such as following the hydrolysis step, the disgestion step, or the oxidation reaction step.

The effluent from the filtering step 19 is comprised predominantly of ethane-1-hydroxy-1,1-diphosphonic acid dissolved in excess acetic acid. Recovery of the hydroxydiphosphonic can then be performed by any of several alternative procedures.

The EHDP is soluble in the acetic acid at the temperatures employed during the hydrolysis step. It is substantially less soluble in acetic acid at lower temperatures, i.e., less than about 70° C. One satisfactory method of recovering the EHDP is to employ a crystallization step 22, which involves cooling the hydrolyzed solution typically to about 30° C. while gently stirring the solution. The mild agitation has a beneficial effect on the crystallization process and results in the formation of larger crystals that tend to separate more easily. While the agitation can be omitted, if desired, it is preferred to accelerate the crystalline formation by employing gentle stirring. Under these conditions, a typical product can be obtained containing over 96% EHDP.

As a modification of the cooling and agitating crystallization process, it is possible to hasten the crystalline formation by seeding the solution with EHDP crystals. They serve as nucleating sites for additional crystalline formation.

The effluent from the crystallizer 22 contains a solid phase comprised predominantly of EHDP crystals, and very small amounts of phosphoric acid and phosphorous acid by-products. There is also a liquid phase containing mostly acetic acid, together with a phosphoric acid byproduct.

Recovery of the EHDP crystals 29, which form in the crystallizer 22, can be carried out by a conventional filtering step 23, such as by using a rotary filter. The filtrate comprised predominantly of acetic acid and phosphoric acid is then separated into two fractions, one to be recycled to the hydrolyzer 17 via line 25 and one to be passed to a distillation column 24. In the distillation column, the acetic acid is stripped from the top via line 27, and the phosphoric acid is recovered via recovery line 30. The acetic acid, if desired, can be recycled via line 27 to an acetic acid surge tank or supply source 11, or directly back to the oxidizer tank 13.

By including the distillation column 24 in the process, it is possible to recover substantial amounts of pure phosphoric acid, e.g., about 15 to 50%. Thus the process has as a distinct advantage the simultaneous preparation of ethane-1-hydroxy-1,1-diphosphonic acid and phosphoric acid.

In certain applications, for instance, in the area of detergent compositions or any other area, it may be desired to provide a mixture of a hydroxyphosphonic acid, e.g., EHDP, and the phosphoric acid. This may be the case, for example, when the present invention is employed to produce builder compounds for use in built detergent compositions where a phosphoric acid salt is used as a detergent aid, e.g., buffer, cleaning agent, etc. If, for any purpose, it is desired to prepare a mixture of EHDP and phosphoric acid, the acetic acid can be stripped off by a distillation column such as 24. The process can be modified, however, to include such a recovery step after the hydrolysis step 17 or the filter step 19. The acids can then be neutralized to any desired salt form by addition of an appropriate base such as, for example, sodium or potassium hydroxide. This neutralization step can be done at any time after the hydrolysis step.

In conjunction with the drawing, the discussion has been presented in terms of preparing ethane-1-hydroxy-1,1-diphosphonic acid (EHDP). This was selected as a representative hydroxydiphosphonic acid to illustrate the present invention. The reaction steps, e.g., the preparation of the elemental phosphorus dispersion in an organic medium containing a carboxylic acid, the oxidation of the elemental phosphorus to an anhydride of trivalent phosphorus in situ, the reaction between the anhydride of trivalent phosphorus and the carboxylic acid, the rearrangement of phosphite intermediates to compounds containing carbon-to-phosphorus bonds, and hydrolysis are all equally applicable to the other carboxylic acids listed above by which corresponding hydroxydiphosphonic acids are prepared.

Examples of hydroxydiphosphonic acids which can be prepared by the present invention besides those mentioned above are hexane-1-hydroxy-1,1-diphosphonic acid; hexadecane-1-hydroxy-1,1-diphosphonic acid; propane-3-carboxy-1-hydroxy-1,1-diphosphonic acid; propane-1,3-dihydroxy-1,1,3,3-tetraphosphonic acid; propane-3-carboxy-1-hydroxy-1,1-diphosphonic acid; butane-1,4-dihydroxy-1,1,4,4-tetraphosphonic acid; and ethane-1-hydroxy-1,1,2-triphosphonic acid, and the like.

An advantage in using lower fatty acids ranging from acetic acid up to about caprylic acid is that they are liquids at room temperature and preparing the dispersion is thereby considerably simplified. They require no solvent or heating step although, if desired, both measures can be employed such as warming the mixture of phosphorus and carboxylic acid to melt the phosphorus.

Many of the carboxylic acids are solids at room temperature and consequently these require the use of a solvent in order to prepare the dispersion of phosphorus. The longer chain length fatty acids ranging up through the $C_{16-18}$ range and on up to $C_{30}$ or so are all solids at room temperature. Any inert organic solvent can be used to get the solid carboxylic acids into solution. Solvents which can be used include aliphatic aromatic or alicyclic materials, e.g., hydrocarbons such as benzene, xylene, kerosene, heptane, petroleum ether, toluene, gasoline, cyclohexane, and the like; ethers, such as diethyl ether, and the like; halogenated hydrocarbons, such as carbon tetrachloride, and the like; carbon disulfide, and the like; or any combination of these solvents. Generally preferred solvents for preparing the dispersion are benzene, carbon disulfide, carbon tetrachloride, and chlorobenzene.

The solvent for the carboxylic acid can also be selected from the diluents mentioned earlier in connection with the exothermic nature of the reaction between the anhydride of trivalent phosphorus acid and the carboxylic acid. Moreover, the inert solvents mentioned above can likewise be used in sufficient quantities to function as the diluent for the exothermic reaction. The proportion of the inert organic solvent to the carboxylic acid being solubilized is not in and of itself critical since the objective of getting the solid carboxylic acid into solution can be obtained with different quantities of the several solvents mentioned. On a weight ratio, however, of solvent to solid carboxylic acid, the proportions should be from about 1:1 to about 100:1 and preferably from 2:1 to about 30:1.

In order to disclose the nature of the invention still more clearly, the following illustrative examples are given. They are in on way intended to limit the full scope of the present invention since still other modifications will become apparent to those skilled in the art from a careful reading of the following examples, especially in light of the foregoing discussion.

EXAMPLE I

A glass reaction flask was fitted with a reflux condenser, mixer, and heating mantle. The reaction flask was charged with 360 grams of glacial acetic acid (6 moles) and 62 grams of yellow phosphorus (0.5 mole). The flask and its contents were heated to 44° C. to melt the phosphorus and then mixed vigorously with a high shear mixer with a one inch diameter head. This suspended the phosphorus in the acetic acid in the form of liquid droplets having a diameter less than 2 centimeters. Oxidizing gas, i.e., air, was then bubbled into the mixture through a tube which opened just beneath the mixing head of the high shear mixer thereby oxidizing the phosphorus to an anhydride of trivalent phosphorus. The volume of air fed was measured using a wet test meter. The air was bubbled into the mixture for 420 minutes with continuous stirring and during this time the temperature of the mixture was held in the range of 46 to 125° C., but for the major part of that time was held at 100–110° C. During the oxidation step, the phosphite intermediate compounds which were formed by the reaction between the acetic acid and the anhydride of trivalent phosphorus were converted to compounds containing carbon bonded to phosphorus. After the addition of oxidizing gas, i.e., air, was terminated, the reaction mixture was hydrolyzed by diluting with 1200 ml. water and filtered in a glove box with an inert nitrogen atmosphere. The solids were removed from the filter and washed with methanol to remove occluded water and acetic acid. They were then dried to give 20.8 grams of a red-brown solid residue which smoked in air.

The filtrate was concentrated and a sample of the product was examined by means of an NMR instrument; the phosphorus NMR spectrum showed the following information.

| Peak | Chemical shift [1] (p.p.m.) | Approximate mole percent | Comment |
|---|---|---|---|
| A | +2.8 | 7 | Unknown. |
| B | 0 | 29 | $H_3PO_4$. |
| C | −15.6 | 12 | EHDP condensate. |
| D | −19.4 | 52 | EHDP. |

[1] Relative to 85% $H_3PO_4=0$.

The presence of EHDP was further proven by the proton spectrum of the neutralized product which showed a characteristic triplet at tau=8.35 p.p.m. and $J$=14 c.p.s. relative to the protons in tetramethylsilane at tau=10.0.

Nearly 40 grams of the 62 grams of phosphorus charged were converted to a water-soluble material. Thus, about 64 mole percent of the charged phosphorus was converted to an EHDP product.

The gas exiting from the flask through the condenser passed through a section of rubber tubing and then into a fume hood. A hypodermic syringe was used to secure samples for gas chromatographic analysis by inserting the needle through the tube wall and filling the syringe with gas. The gas chromatograph instrument was equipped with a column packed with molecular sieves which could separate the $O_2$ and $N_2$ components of the gas. Samples of the exit gas were checked at intervals with the gas chromatograph. It was found that 2.2 moles of oxygen had been taken up per mole of $P_4$.

EXAMPLE II

In this example, benzene was used as a solvent in order to obtain a system in which the reaction can occur in solution, 24 grams of phosphorus (0.2 mole), 93 grams of acetic acid (1.5 moles), and 300 grams of benzene (4 moles) were charged to a 1 liter glass reaction vessel equipped with a high shear type agitator, reflux condenser, means for heating and for adding air to the charge. The mixture was heated, and agitation was begun as soon as the phosphorus melted at about 45° C. to give a fine dispersion of elemental phosphorus having particle sizes substantially less than 2 centimeters. When the temperature reached 80° C., oxidizing gas, i.e., air, was blown into the mixture at a rate of 1 liter per minute from a tube located directly below the agitator. The temperature was maintained at 80–82° C. and 80.9 liters of air were blown through the mixture over a period of 80 minutes. During this period, the mixture which was initially colorless passed through various shades of yellow to a final orange color, and suspended solid particles were observed forming in the reactor.

The benzene was then stripped off by heating and blowing with nitrogen. The reaction mixture containing phosphite intermediate compounds was then heated to reflux (118° C.) and refluxed for 1 hour in order to convert the phosphite intermediate compounds to compounds containing carbon-to-phosphorus bonds. Water was added to hydrolyze the mixture, after which it was filtered. The filtrate was concentrated by evaporation of part of the water.

Analysis by $P^{31}MR$ revealed that 45.0% of the phosphorus in the water-soluble product was present as EHDP having a chemical shift of −19.3 p.p.m. relative to orthophosphoric acid as 0.0. Two other peaks at −14.7 p.p.m. and −8.3 p.p.m. represented EHDP condensate corresponding to 21.2% of the sample. This material may be hydrolyzed to EHDP by refluxing the acidic solution, giving an overall yield of 66.2% EHDP. 25.2% of the phorphorus was present as the phosphoric acid, and the remaining 8.6% was distributed between 2 unknowns with shifts of +5.6 p.p.m. and +3.2 p.p.m. Proton NMR confirms this analysis.

EXAMPLE III 40 grams of phosphorus (0.323 mole) and 210 milliliters of acetic acid (3.66 moles) were charged to a nominal 300 cc. stirred autoclave. A fine dispersion of elemental phosphorus was obtained having particle sizes substantially less than 2 centimeters. The mixture was heated to a temperature of 80° C. The materials occupied 90% of the free volume in the autoclave, thereby minimizing the chances for a gas phase reaction or detonation. 44 grams of oxygen (1.375 moles) were fed into the reactor over a period of 1 hour and 20 minutes to oxidize in situ the phosphorus to an anhydride of trivalent phosphorus which reacted with the acetic acid to form phosphite intermediate compounds. The oxygen pressure ranged up to 500 p.s.i.g., averaging about 200 p.s.i.g. over the period. After the oxidation step was completed the mixture was heated to 120° C. and held there for a period of 30 minutes in order to digest the reaction mixture and thereby convert the phosphite intermediate compounds to compounds containing carbon-to-phosphorus bonds. The reaction products were washed from the autoclave with water and then refluxed for two hours to hydrolyze them to their acid forms.

At this point, the hydrolyzed product solution contained a small amount of yellow-orange solids which, when filtered out and dried, were found to weigh 0.21 gram. Thus, 99.5% of the phosphorus charged had been converted to water-soluble materials. Analysis of the filtrate by $P^{31}NMR$ showed it to contain 69.9% ethane-1-hydroxy-1,1-diphosphonic acid and 30.1% orthophosphoric acid.

EXAMPLE IV

Trisodium ethane-1-hydroxy-1,1-diphosphonate was prepared by reacting in a fine dispersion 750 ml. acetic acid (13.1 moles) and 100 grams phosphorus (0.806 mole) in a 1 liter stirred autoclave with oxygen. 122 grams of oxygen (3.42 moles) were fed to the autoclave to form an anhydride of trivalent phosphorus in situ. The oxidation reaction was carried out at about 63° C. for 1½ hours during which the acetic acid and the anhydride of trivalent phosphorus were reacting. Following the oxidation, the reaction mixture was heated to 120° C. for 1 hour to complete the reaction between the anhydride of trivalent phosphorus and acetic acid and also to provide for the molecular rearrangement to the carbon-phosphorus compounds. The products were cooled to less than 50° C. and washed from the autoclave with 500 ml. of water. After hydrolysis comprising refluxing for three hours at 100° C., the product was again cooled and filtered and a sample of the filtrate was concentrated by vacuum evaporation and neutralized to pH 9 for analysis by $P^{31}NMR$. The filter cake weight of 5.4 grams indicated that 94.6% of the phosphorus fed was converted to water-soluble products, and analysis of the water phase showed 73% of the phosphorus present as ethane-1-hydroxy-1,1-diphosphonate and 27% as sodium orthophosphate.

EXAMPLE V 14 grams (0.113 mole) of phosphorus and 60 grams (1.0 mole) acetic acid were charged to a 1 liter stirred autoclave along with 690 cc. of carbon tetrachloride solvent. The mixture was vigorously stirred to form a fine phosphorus dispersion. 20 grams (0.6 mole) of oxygen were then fed to the reactor over a period of 30 minutes at a temperature of 100° C. and pressures ranged up to 300 p.s.i. The phosphorus was oxidized to an anhydride of trivalent phosphorus which reacted with the acetic acid. The reactants were then digested at 100° C. for ½ hour to convert phosphite intermediates to carbon-phosphorus bonded compounds which were washed from the autoclave with water, and hydrolyzed at 90° C. for 1 hour. The water-soluble product was isolated by distilling off the carbon tetrachloride and filtering out the solids. Analysis by $P^{31}NMR$ revealed 52% phosphorus as trisodium ethane-1-hydroxy-1,1-diphosphonate, 10% as ethane-1-hydroxy-1,1-diphosphonate precursors, and 38% as sodium orthophosphate.

EXAMPLE VI 171 grams (1.64 moles) malonic acid and 20 grams (0.161 mole) phosphorus were charged to a 1 liter stirred autoclave along with 600 ml. of sulfolane ($CH_2CH_2CH_2CH_2SO_2$) which was used as the reaction solvent. A fine dispersion of phosphorus was obtained. Over a period of 1½ hours, 23 grams (.72 mole) oxygen was fed to the reactor while the temperature varied from 59° C. to 76° C. and the pressure temperature varied from p.s.i.g. and 200 p.s.i.g. The phosphorus during oxygen addition was converted in situ to an anhydride of trivalent phosphorus which reacted with the malonic acid. Following this reaction step, the reaction mixture was digested at a temperature of 120° C. for 30 minutes to allow time for conversion of phosphite intermediates formed by the reaction between the malonic acid and the anhydride of trivalent phosphorus to compounds containing carbon bonded to phosphorus. The reaction products were then cooled to approximately 50° C., rinsed from the autoclave with 1 liter of distilled water and refluxed for 2 hours at 100° C. to hydrolyze the products. The mixture was filtered to remove unreacted phosphorus (cake weight 0.6 grams, indicating that 97% of the feed phosphorus was converted to water-soluble product) and the sulfolane solvent was extracted with chloroform. A portion of the aqueous product containing solution was concentrated, neutralized to pH 9 with NaOH, and analyzed by $P^{31}NMR$. It was found that 34% of the phosphorus was present as an ethane-2-carboxyl-1-hydroxy-1,1-diphosphonate, 22% as sodium orthophosphite, and 44% as sodium orthophosphate.

EXAMPLE VII

Using a 1 liter stirred autoclave, 40 grams of phosphorus (0.33 mole) was dispersed into 188 grams of hexanoic acid (1.62 moles), and 37 grams (1.15 moles) oxygen were reacted in 600 ml. $CCl_4$ solvent for a period of 50 minutes at a temperature ranging between 67° C. and 79° C. The phosphorus was thereby oxidized in situ to an anhydride of trivalent phosphorus which reacted with the hexanoic acid to form phosphite intermediate compounds which were subsequently converted to carbon-phosphorus bonded compounds by heating the reaction mixture to 120° C. for 30 minutes. After work-up of the product, including a hydrolysis step at 90° C. for 4 hours, it was found that 87.5% of the phosphorus had been converted to water-soluble products of which 46 atom percent of the phosphorus was hexane-1-hydroxy-1,1-diphosphonic acid, 17 atom percent was orthophosphorous acid, and 37 atom percent was orthophosphoric acid.

EXAMPLE VIII 226 grams (1.125 moles) of dodecanoic acid, 20 grams (0.161 moles) of phosphorous, and 540 milliliters of carbon tetrachloride solvent were charged to a 1 liter stirred autoclave. A fine dispersion of phosphorus was obtained in the organic medium. 24 grams (0.75 mole) of oxygen were fed to the reactor over a period of 37 minutes to convert the phosphorus in situ to an anhydride of trivalent phosphorus which then reacted with the dodecanoic acid. The amount of oxygen fed was determined by feeding oxygen as long as it was readily reacted. During the reaction, the temperature ranged between 60° C. and 81° C., averaging about 75° C. The reactive mixture was next heated to 120° C. for an hour to convert phosphite intermediates to carbon-phosphorus bonded compounds. The mixture was then washed from the autoclave with two liters of water and hydrolyzed by boiling at 100° C. for 4 hours. The solvent was simultaneously removed. After extraction of the unreacted dodecanoic acid, a portion of the product solution was filtered to remove unoxidized phosphorous, concentrated, neutralized to pH 9, and analyzed by $P^{31}NMR$. It was found to contain 10% dodecane-1-hydroxy-1,1-diphosphonate, 36% organophosphonate material with an NMR displacement of approximately −13 p.p.m. relative to 85% $H_3PO_4$ as 0, and 54% sodium orthophosphate.

EXAMPLE IX 123 grams (1.62 moles) glycolic acid (hydroxy acetic acid) and 20 grams (0.161 mole) phosphorus are charged to a 1 liter stirred autoclave along with 670 ml. carbon tetrachloride solvent. A dispersion of the phosphorus is prepared thereby. Oxygen is passed into the dispersion for 30 minutes at 90° C. with pressures up to 300 p.s.i.g., using a total feed of 25 grams (0.78 mole) oxygen. The phosphorus is oxidized in situ to an anhydride of trivalent phosphorus which reacts with the glycolic acid to form phosphite intermediates. The mixture is then digested at 120° C. for ½ hour to convert to carbon-phosphorus bonded compounds, cooled, washed from the autoclave with 1 liter water, and hydrolyzed by refluxing the entire mixture at atmospheric pressure for 4 hours. Isolation of the water-soluble portion of the product and analysis by $P^{31}NMR$ shows a significant portion of the phosphorus to be present as an ethane-1,2-dihydroxy-1,1-diphosphonic acid moiety, along with by-product inorganic phosphorous and phosphoric acids.

EXAMPLE X 164 grams (0.64 mole) 1-hexadecanoic acid and 20 grams (0.161 mole) $P_4$ were charged to a 1 liter stirred autoclave along with 640 ml. carbon tetrachloride solvent to prepare a phosphorus dispersion. About 22.4 grams (approximately 0.7 mole) of $O_2$ were fed to the reactor over a period of 15 minutes at a temperature of 70° C. and pressures up to 300 p.s.i.g. At the end of the oxidation, the material was digested for 2 hours at 120° C., cooled, and washed from the autoclave with water. The product was hydrolyzed by refluxing at atmospheric pressure for 4 hours, and the water-soluble portion was isolated by extraction and filtration and neutralized. NMR analysis showed that 23% of the phosphorus is present as hexadecane-1-hydroxy-1,1-diphosphonic acid, 21% as phosphite and 56% as phosphate.

EXAMPLE XI 20 grams (.161 mole) $P_4$, 110 grams (0.81 mole) phenyl acetic acid, and 700 ml. $CHCl_3$ were charged to a 1 liter stirred autoclave. A dispersion of phosphorus was obtained. 25 grams (.78 mole) oxygen were fed to the reactor over a period of 30 minutes while the temperature was maintained at about 25° C. and the pressure averaged 300 p.s.i.g. The reaction product was digested at 110° C. for 90 minutes, cooled, washed from the autoclave with a liter of water, and hydrolyzed by refluxing at atmospheric pressure for 2 hours. After filtration to remove any unreacted phosphorus and concentration and neutralization of the water phase, NMR analysis showed the reaction product to contain 5% ethane-2-phenyl-1 hydroxy-1,1-diphosphonic acid, 56% orthophosphorous acid, and 39% orthophosphoric acid.

The hydroxydiphosphonic acid compounds prepared by the process described herein are valuable sequestering compounds and complex formers for metal ions especially for polyvalent metal ions. They can be used widely for such applications. For example, they can be used to soften water for domestic and industrial purposes, e.g., water softeners, boilers and the like. Varied uses for sequestering agents including the compounds of the present invention are listed and described by a text written by Chabarek & Martell, entitled "Organic Sequestering Agents," published by John Wiley & Sons, copyright 1959. In addition, the hydroxydiphosphonic acids and their salts are described in United States Patent 3,214,454 to Blaser et al. which issued Oct. 26, 1965. The patent discloses numerous useful applications of compounds of the type prepared by the present invention, including water softening; textile treatments to remove encrustations due to deposit of alkaline earth salts; bottle washing; additives to dye baths for textiles to bind metal ion complexes to order to prevent these metal ions from forming undesirable hues and shades of color.

The compositions of the present invention are also valuable as additives in soap and detergent compositions. In addition to tying up the hardness-imparting minerals in water, the compounds herein are useful as stabilizing agents in soap compositions. Moreover, they are valuable as washing agents or as auxiliary washing agents consisting of a compressed mixture of powders such as are described in French Patent 1,408,414, dated July 5, 1965, issued to Henkel & Cie.

In addition, ethane-1-hydroxy-1,1-diphosphonic acid and salts thereof are disclosed as being useful builders in detergent compositions in United States Patent 3,159,581, issued to F. L. Diehl on Dec. 1, 1964.

Other modifications and variations of the hereindescribed process which fall within the broad scope of the present invention will be apparent to persons skilled in the art.

Having so described the invention, what is sought to be protected by Letters Patent is:

1. A process for preparing a hydroxydiphosphonic acid which comprises the steps of
    (a) preparing a dispersion of white (yellow) phosphorus in an organic medium comprising an aliphatic carboxylic acid having from 2 to about 30 carbon atoms,
    (b) introducing an oxygen containing gas into said dispersion with vigorous mixing at a temperature of about 20° C. to about 140° C. for a period of from about 1 minute to about 6 hours,
    (c) and thereafter hydrolyzing the reaction mixture with water to obtain the hydroxydiphosphonic acid.

2. A process according to claim 1 in which the carboxylic acid is selected from the group consisting of aliphatic monocarboxylic and aliphatic polycarboxylic acids and the reaction mixture from step (b) is digested for a period of from about 1 minute to about 4 hours at a temperature in the range of from about 70° C. to about 170° C. prior to hydrolyzing in step (c).

3. A process according to claim 1 in which the mean diameter of the dispersed phosphorus particles is less than 2 centimeters.

4. A process according to claim 1 in which the dispersion contains a nonaqueous, inert, organic solvent.

5. A process according to claim 1 in which the organic solvent is used on a weight ratio basis of solvent to elemental phosphorus of from about 1:1 to about 50:1.

6. A process according to claim 5 in which the carboxylic acid is acetic acid.

7. A process according to claim 2 in which the digestion step is performed at a temperature in the range of from about 90° C. to about 150° C. for a period of from about 5 minutes to about 1½ hours.

8. A process according to claim 1 in which the hydrolysis reaction is performed at a temperature in the range of from about 100° C. to about 150° C.

9. A process for preparing ethane-1-hydroxy-1,1-diphosphonic acid which comprises the steps of
    (a) preparing a dispersion of white (yellow) phosphorus in acetic acid,
    (b) introducing an oxygen containing gas into said dispersion with vigorous mixing while the dispersion has a temperature in the range of from about 20° C. to about 140° C. for a period of from about 1 minute to about 6 hours,
    (c) digesting the reaction mixture at a temperature in the range of from about 70° C. to about 170° C. for a period of from about 1 minute to about 4 hours,
    (d) and, thereafter, hydrolyzing the digested reaction mixture with water.

10. The process according to claim 9 in which the oxygen containing gas is air or oxygen.

11. The process according to claim 9 in which the dispersion has a temperature in the range of from about 50° C. to about 100° C.

12. The process according to claim 9 in which the reaction time is from about 2 minutes to about 4 hours.

13. The process according to claim 9 in which the digestion is performed at a temperature in the range of from about 90° C. to about 150° C. over a period of from about 5 minutes to about 1½ hours.

References Cited

UNITED STATES PATENTS

| | | | |
|---|---|---|---|
| 2,848,475 | 8/1958 | Schmidt | 260—932 |
| 3,122,417 | 2/1964 | Blaser et al. | 260—502.4 |
| 3,202,579 | 8/1965 | Berth et al. | 260—502.4 |
| 3,213,129 | 10/1965 | Berth et al. | 260—502.4 |

FOREIGN PATENTS 1,148,551  5/1963  Germany.

OTHER REFERENCES

Grunz et al.: "Chem. Pen.," 93 (1960), pp. 2631–8.

Menschutkin: "Annalen der Chemie und Pharmacie," Pande 133–4 (1865), pp. 317 to 320.

Wazer: "Phosphorus and Its Compounds," vol. 1 (1958), p. 371.

LEON ZITVER, *Primary Examiner.*

J. E. EVANS, *Assistant Examiner.*